US012694336B2

(12) United States Patent
Jacobson et al.

(10) Patent No.: US 12,694,336 B2
(45) Date of Patent: Jul. 28, 2026

(54) SYSTEM AND METHOD FOR DETERMINING PROCESS COMPLIANCE USING ADVANCED COMPUTATIONAL MODELS FOR DATA ANALYSIS AND AUTOMATED DECISION-MAKING

(71) Applicant: BANK OF AMERICA CORPORATION, Charlotte, NC (US)

(72) Inventors: Brian Neal Jacobson, Los Angeles, CA (US); Pratap Dande, Saint Johns, FL (US); Erik Dahl, Newark, DE (US); Elvis Nyamwange, Little Elm, TX (US); Rahul Yaksh, Austin, TX (US); Amer Ali, Jersey City, NJ (US); Rahul Shashidhar Phadnis, Charlotte, NC (US); Sailesh Vezzu, Hillsborough, NJ (US); Hari Vuppala, Concord, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 516 days.

(21) Appl. No.: 18/240,400

(22) Filed: Aug. 31, 2023

(65) Prior Publication Data

US 2025/0077938 A1     Mar. 6, 2025

(51) Int. Cl.
*G06N 20/00* (2019.01)

(52) U.S. Cl.
CPC .................................... *G06N 20/00* (2019.01)

(58) Field of Classification Search
CPC .................................................... G06N 20/00
See application file for complete search history.

(56) References Cited

U.S. PATENT DOCUMENTS

| | | | |
|---|---|---|---|
| 10,476,953 B1 | 11/2019 | Badawy | |
| 10,681,056 B1 | 6/2020 | Badawy | |
| 10,803,181 B2 | 10/2020 | McCoy | |
| 10,848,499 B2 | 11/2020 | Badawy | |
| 10,938,828 B1 | 3/2021 | Badawy | |
| 11,122,050 B2 | 9/2021 | Badawy | |
| 11,196,775 B1 | 12/2021 | Badawy | |
| 11,227,055 B1 | 1/2022 | Badawy | |
| 11,308,186 B1 | 4/2022 | Domsch | |
| 11,461,677 B2 | 10/2022 | Badawy | |
| 11,516,219 B2 | 11/2022 | Badawy | |

(Continued)

*Primary Examiner* — Y Lee

(74) *Attorney, Agent, or Firm* — Moore & Van Allen PLLC; William Walters

(57) ABSTRACT

Systems, computer program products, and methods are described herein for determining process compliance using advanced computational models for data analysis and automated decision-making. The present disclosure is configured to generate one or more intermediate control layers, wherein the one or more intermediate control layers comprises one or more artificial intelligence models; generate one or more control objectives, wherein each of the one or more control objectives are associated with one or more governance processes; generate, in response to the one or more control objectives, one or more manifests; receive, in response to the one or more manifests, one or more artifacts, wherein the one or more artifacts comprise data associated with the one or more governance processes; capture data from the one or more artifacts; compare the captured data from the one or more artifacts with the one or more intermediate control layers; and approve the one or more artifacts.

20 Claims, 8 Drawing Sheets

(56)            References Cited

U.S. PATENT DOCUMENTS

| | | | |
|---|---|---|---|
| 11,516,259 | B2 | 11/2022 | Badawy |
| 11,533,314 | B2 | 12/2022 | Badawy |
| 11,695,828 | B2 | 7/2023 | Badawy |
| 11,710,078 | B2 | 7/2023 | Badawy |
| 11,809,581 | B2 | 11/2023 | Badawy |
| 11,811,833 | B2 | 11/2023 | Badawy |
| 11,818,136 | B2 | 11/2023 | Badawy |
| 2020/0396312 | A1 | 12/2020 | Anderson, III |
| 2022/0300586 | A1 | 9/2022 | Domsch |

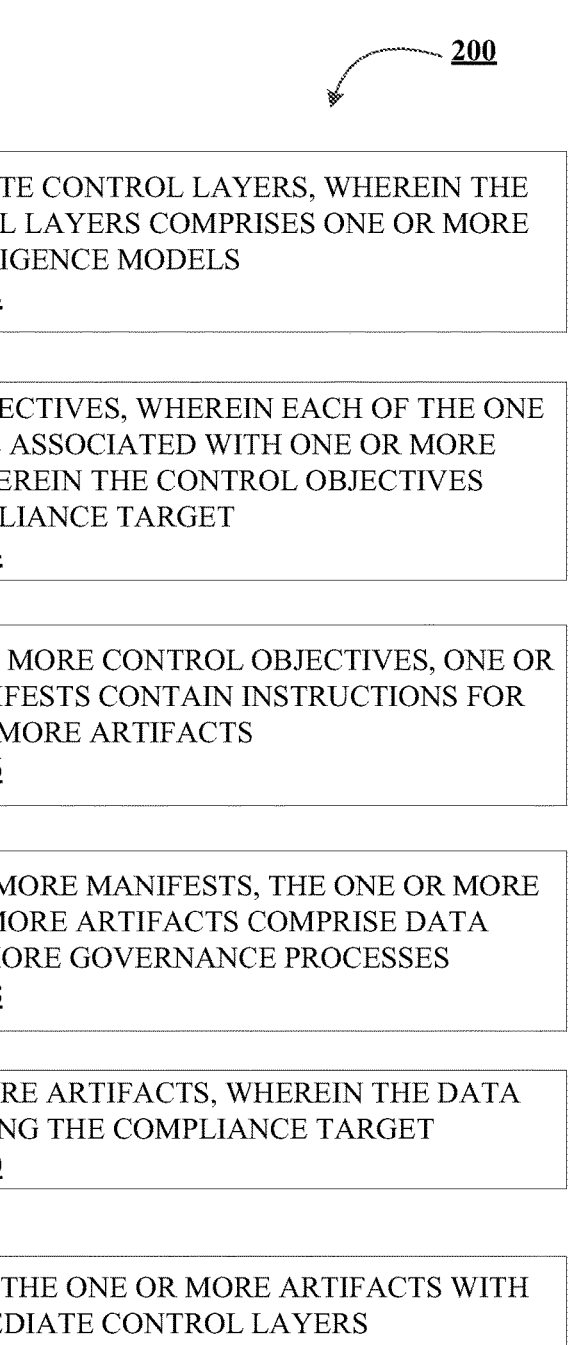

GENERATE ONE OR MORE INTERMEDIATE CONTROL LAYERS, WHEREIN THE ONE OR MORE INTERMEDIATE CONTROL LAYERS COMPRISES ONE OR MORE ARTIFICIAL INTELLIGENCE MODELS
202

GENERATE ONE OR MORE CONTROL OBJECTIVES, WHEREIN EACH OF THE ONE OR MORE CONTROL OBJECTIVES ARE ASSOCIATED WITH ONE OR MORE GOVERNANCE PROCESSES, AND WHEREIN THE CONTROL OBJECTIVES COMPRISE A COMPLIANCE TARGET
204

GENERATE, IN RESPONSE TO THE ONE OR MORE CONTROL OBJECTIVES, ONE OR MORE MANIFESTS, WHEREIN THE MANIFESTS CONTAIN INSTRUCTIONS FOR RECEIVING ONE OR MORE ARTIFACTS
206

RECEIVE, IN RESPONSE TO THE ONE OR MORE MANIFESTS, THE ONE OR MORE ARTIFACTS, WHEREIN THE ONE OR MORE ARTIFACTS COMPRISE DATA ASSOCIATED WITH THE ONE OR MORE GOVERNANCE PROCESSES
208

CAPTURE DATA FROM THE ONE OR MORE ARTIFACTS, WHEREIN THE DATA COMPRISES EVIDENCE OF MEETING THE COMPLIANCE TARGET
210

COMPARE THE CAPTURED DATA FROM THE ONE OR MORE ARTIFACTS WITH THE ONE OR MORE INTERMEDIATE CONTROL LAYERS
212

APPROVE THE ONE OR MORE ARTIFACTS
214

FIGURE 2

300

214

DETERMINE, IN RESPONSE TO COMPARING THE CAPTURED DATA FROM THE ONE OR MORE ARTIFACTS WITH THE ONE OR MORE CONTROL OBJECTIVES, A RECEIVED EVIDENCE THRESHOLD, WHEREIN THE RECEIVED EVIDENCE THRESHOLD COMPRISES CHARACTERISTICS ASSOCIATED WITH THE ARTIFACTS
302

COMPARE THE RECEIVED EVIDENCE THRESHOLD WITH AN ACCEPTABLE EVIDENCE THRESHOLD, WHEREIN THE ACCEPTABLE EVIDENCE THRESHOLD COMPRISES CHARACTERISTICS ASSOCIATED WITH THE INTERMEDIATE CONTROL LAYERS
304

APPROVE, IN RESPONSE TO THE RECEIVED EVIDENCE THRESHOLD MEETING THE ACCEPTABLE EVIDENCE THRESHOLD, THE ONE OR MORE ARTIFACTS
306

FIGURE 3

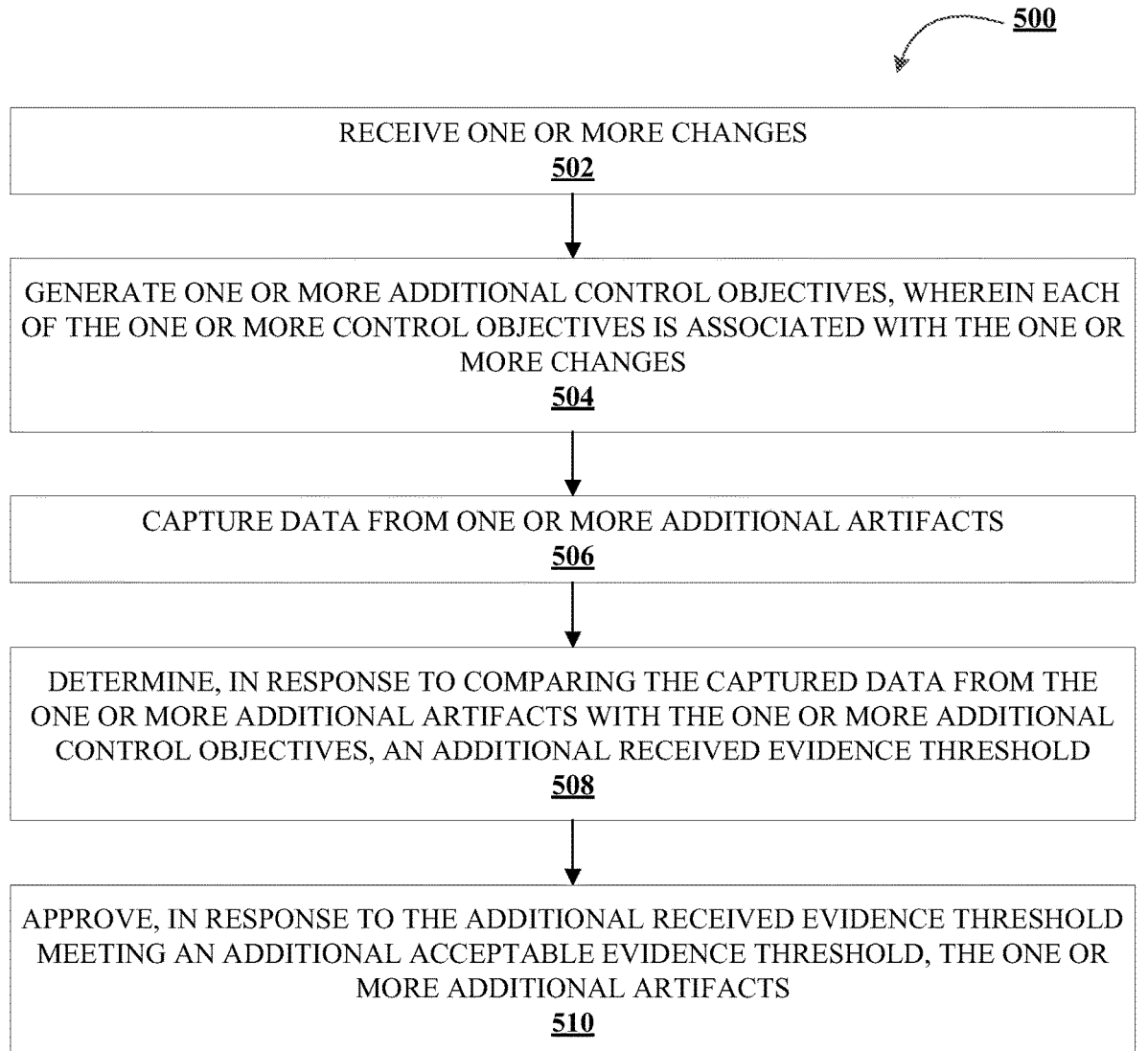

RECEIVE ONE OR MORE CHANGES
502

GENERATE ONE OR MORE ADDITIONAL CONTROL OBJECTIVES, WHEREIN EACH OF THE ONE OR MORE CONTROL OBJECTIVES IS ASSOCIATED WITH THE ONE OR MORE CHANGES
504

CAPTURE DATA FROM ONE OR MORE ADDITIONAL ARTIFACTS
506

DETERMINE, IN RESPONSE TO COMPARING THE CAPTURED DATA FROM THE ONE OR MORE ADDITIONAL ARTIFACTS WITH THE ONE OR MORE ADDITIONAL CONTROL OBJECTIVES, AN ADDITIONAL RECEIVED EVIDENCE THRESHOLD
508

APPROVE, IN RESPONSE TO THE ADDITIONAL RECEIVED EVIDENCE THRESHOLD MEETING AN ADDITIONAL ACCEPTABLE EVIDENCE THRESHOLD, THE ONE OR MORE ADDITIONAL ARTIFACTS
510

FIGURE 5

SYSTEM AND METHOD FOR DETERMINING PROCESS COMPLIANCE USING ADVANCED COMPUTATIONAL MODELS FOR DATA ANALYSIS AND AUTOMATED DECISION-MAKING

TECHNOLOGICAL FIELD

Example embodiments of the present disclosure relate to determining process compliance using advanced computational models for data analysis and automated decision-making.

BACKGROUND

There significant challenges associated with determining process compliance. Applicant has identified a number of deficiencies and problems associated with determining process compliance using advanced computational models for data analysis and automated decision-making. Through applied effort, ingenuity, and innovation, many of these identified problems have been solved by developing solutions that are included in embodiments of the present disclosure, many examples of which are described in detail herein

BRIEF SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Systems, methods, and computer program products are provided for determining process compliance using advanced computational models for data analysis and automated decision-making.

Embodiments of the present invention address the above needs and/or achieve other advantages by providing apparatuses (e.g., a system, computer program product, and/or other devices) and methods for determining process compliance using advanced computational models for data analysis and automated decision-making. The system embodiments may comprise a processing device and a non-transitory storage device containing instructions when executed by the processing device, to perform the steps disclosed herein. In computer program product embodiments of the invention, the computer program product comprises a non-transitory computer-readable medium comprising code causing an apparatus to perform the steps disclosed herein. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the steps disclosed herein.

In some embodiments, the present invention generates one or more intermediate control layers, wherein the one or more intermediate control layers comprises one or more artificial intelligence models. In some embodiments, the present invention generates one or more control objectives, wherein each of the one or more control objectives are associated with one or more governance processes. In some embodiments, the present invention generates, in response to the one or more control objectives, one or more manifests. In some embodiments, the present invention receives, in response to the one or more manifests, one or more artifacts, wherein the one or more artifacts comprise data associated with the one or more governance processes. In some embodiments, the present invention captures data from the one or more artifacts. In some embodiments, the present invention compares the captured data from the one or more artifacts with the one or more intermediate control layers. In some embodiments, the present invention approves the one or more artifacts.

In some embodiments, approving the one or more artifacts further comprises determining, in response to comparing the captured data from the one or more artifacts with the one or more control objectives, a received evidence threshold. In some embodiments, approving the one or more artifacts further comprises comparing the received evidence threshold with an acceptable evidence threshold. In some embodiments, approving the one or more artifacts further comprises approving, in response to the received evidence threshold meeting the acceptable evidence threshold, the one or more artifacts.

In some embodiments, the present invention determines an amount of resources consumed associated with approving the one or more artifacts. In some embodiments, the present invention reduces the amount of resources consumed by a resource conservation amount.

In some embodiments, receiving the one or more artifacts further comprises determining, in response to the one or more manifests, the one or more artifacts applicable to the one or more control objectives. In some embodiments, receiving the one or more artifacts further comprises transmitting the one or more artifacts to one or more control owners, wherein the one or more control owners are users of the system. In some embodiments, receiving the one or more artifacts further comprises receiving, in response to the one or more control owners, an approval of the one or more artifacts.

In some embodiments, the present invention receives one or more changes. In some embodiments, the present invention generates one or more additional control objectives, wherein each of the one or more control objectives is associated with the one or more changes. In some embodiments, the present invention captures data from one or more additional artifacts. In some embodiments, the present invention determines, in response to comparing the captured data from the one or more additional artifacts with the one or more additional control objectives, and additional received evidence threshold. In some embodiments, the present invention approves, in response to the additional received evidence threshold meeting an additional acceptable evidence threshold, the one or more additional artifacts.

In some embodiments, the changes may be changes to the one or more governance processes, one or more control objectives, one or more manifests, or one or more artifacts.

In some embodiments, the present invention aggregates the captured data from the one or more artifacts. In some embodiments, the present invention compares, in response to the one or more control objectives, the aggregated captured data from the one or more artifacts with the one or more governance processes. In some embodiments, the present invention verifies the aggregated captured data from the one or more artifacts matches the one or more governance processes.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
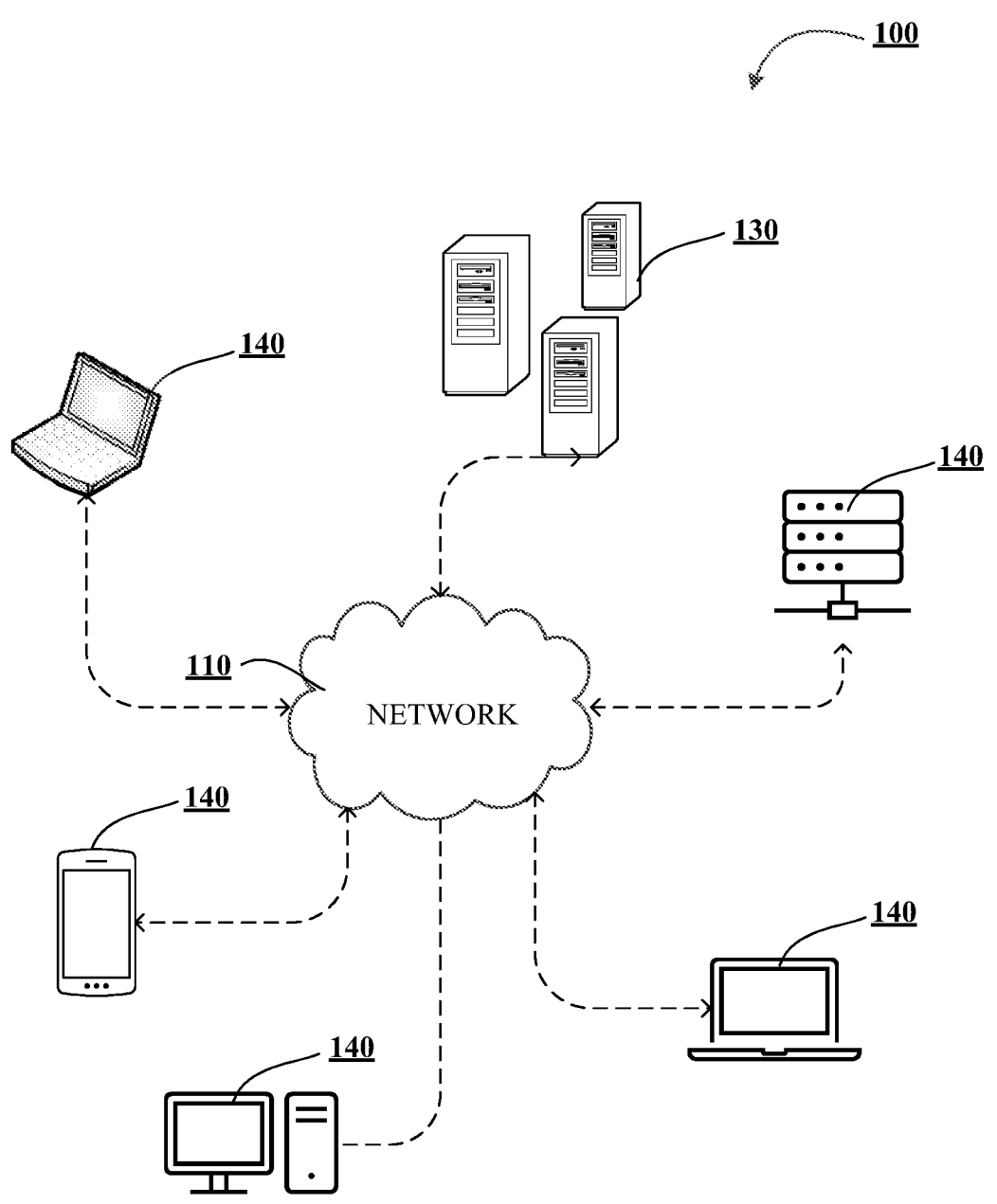
Figure 1B:
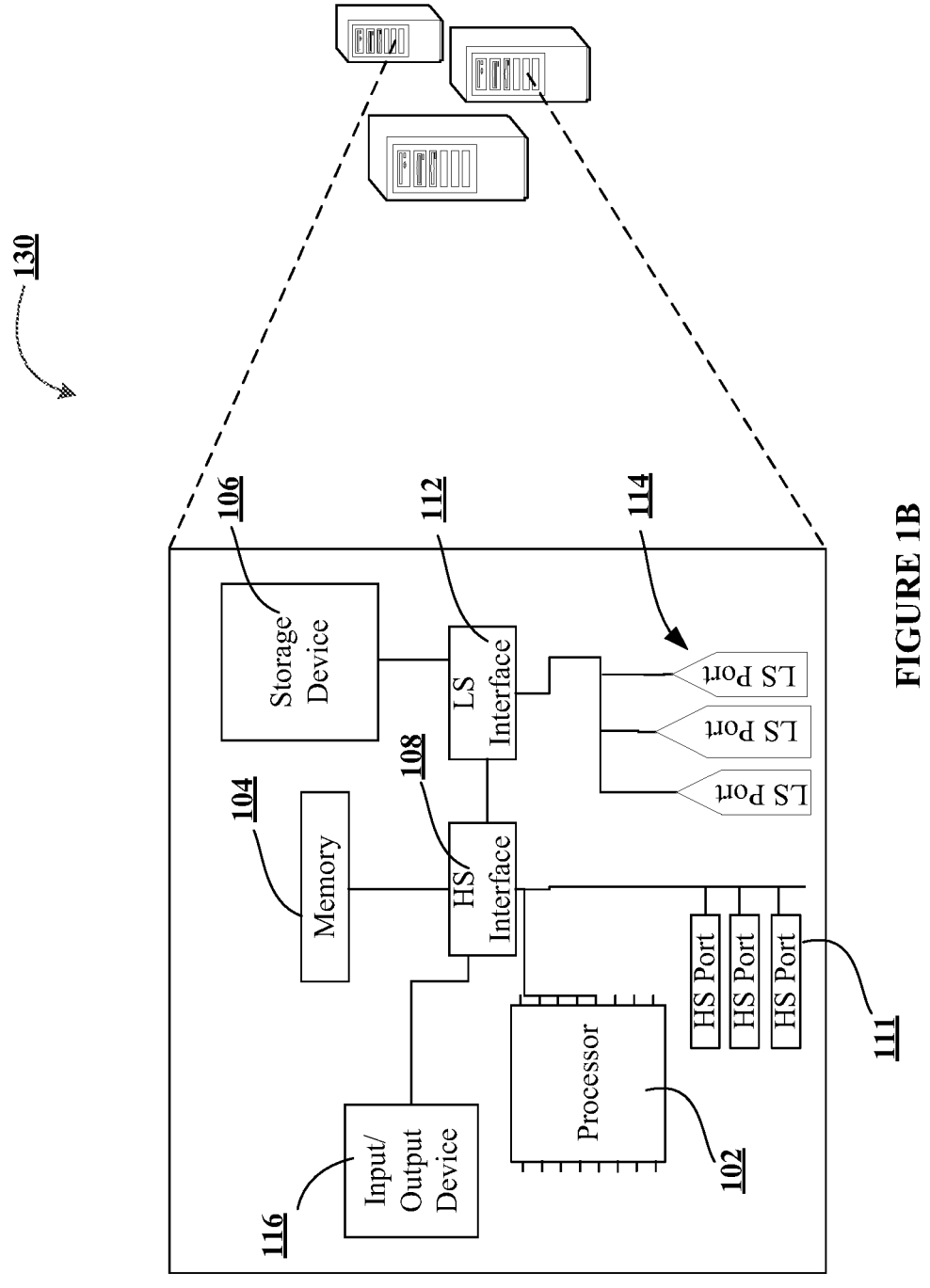
Figure 1C:
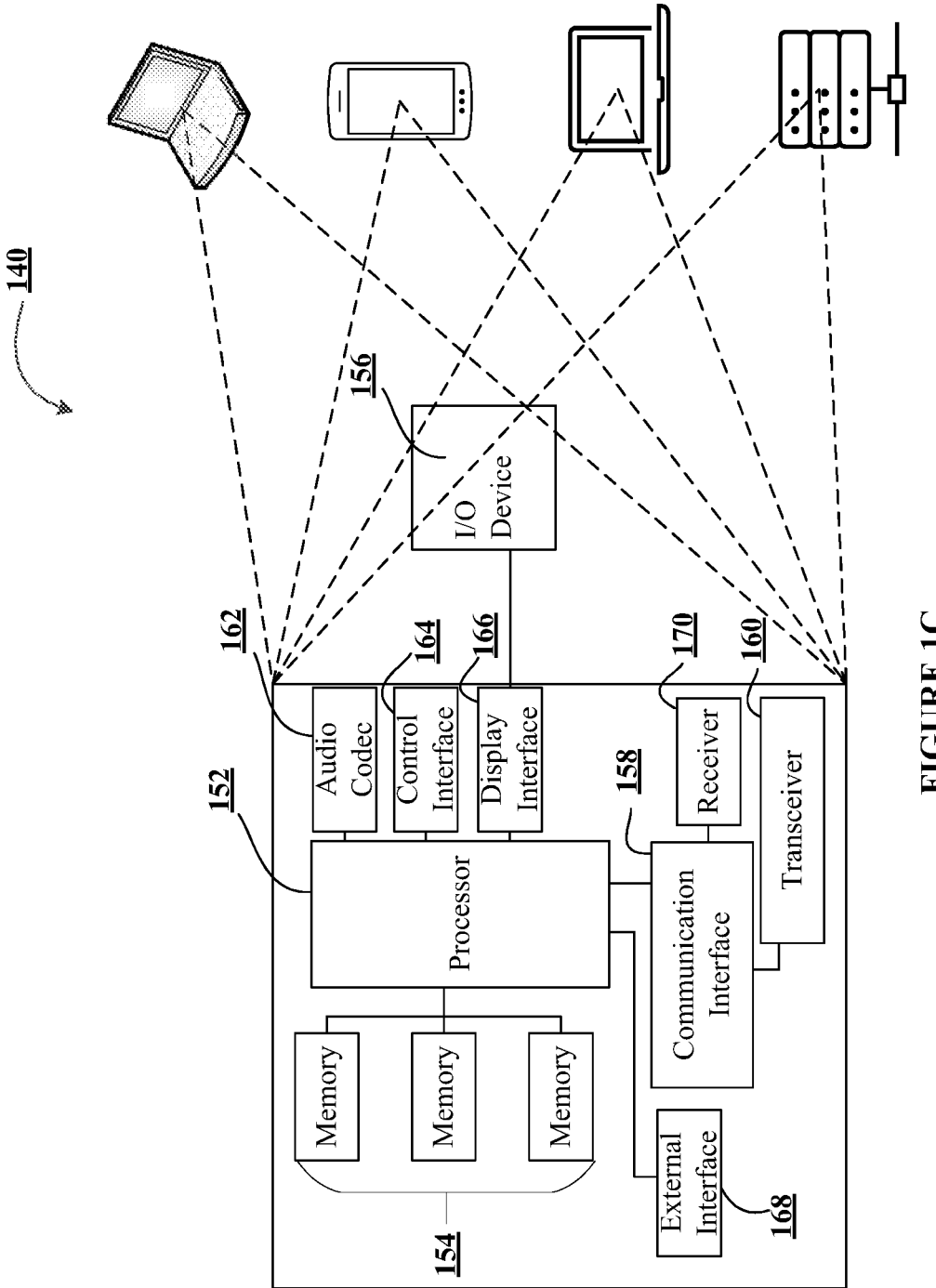

FIGS. 1A-1C illustrates technical components of an exemplary distributed computing environment for determining process compliance using advanced computational models for data analysis and automated decision-making, in accordance with an embodiment of the disclosure;

FIG. 2 illustrates a process flow for determining process compliance using advanced computational models for data analysis and automated decision-making, in accordance with an embodiment of the disclosure.

FIG. 3 illustrates a process flow for approving one or more artifacts, in accordance with an embodiment of the disclosure.

Figure 4:
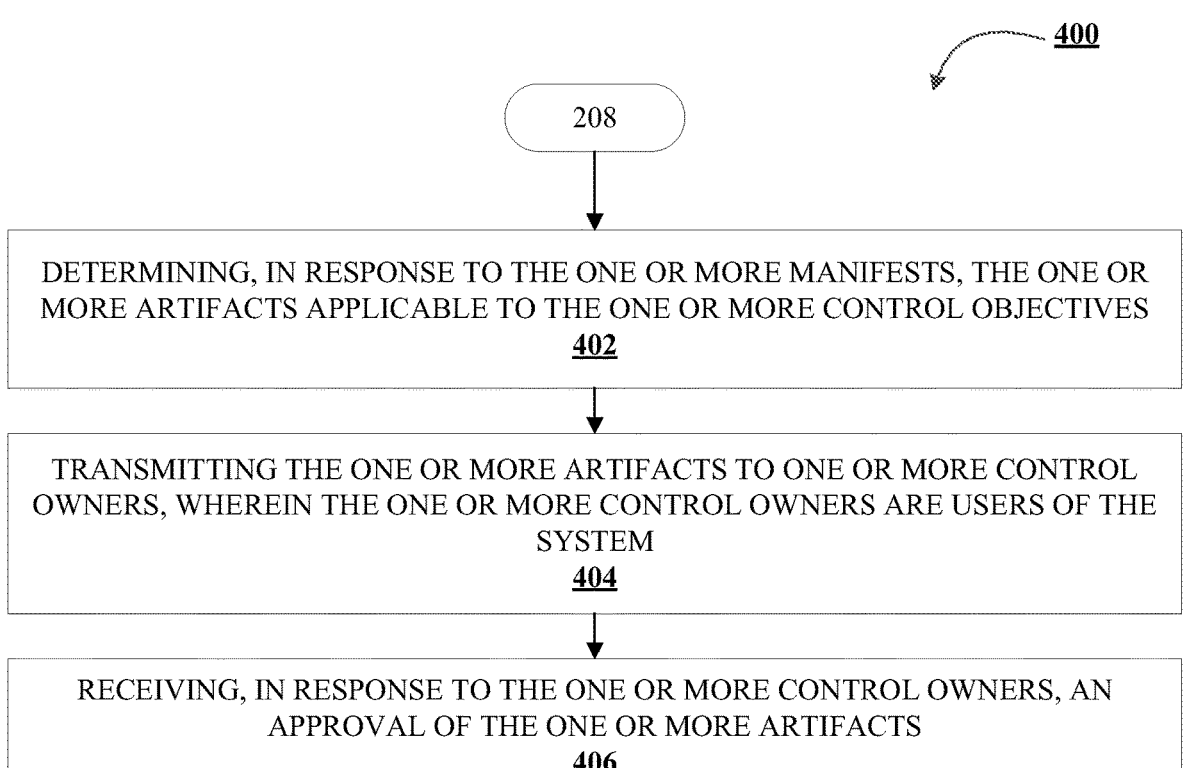

FIG. 4 illustrates a process flow for receiving an approval of the one or more artifacts, in accordance with an embodiment of the disclosure.

FIG. 5 illustrates a process flow for approving, in response to receiving one or more changes, the one or more artifacts, in accordance with an embodiment of the disclosure.

Figure 6:
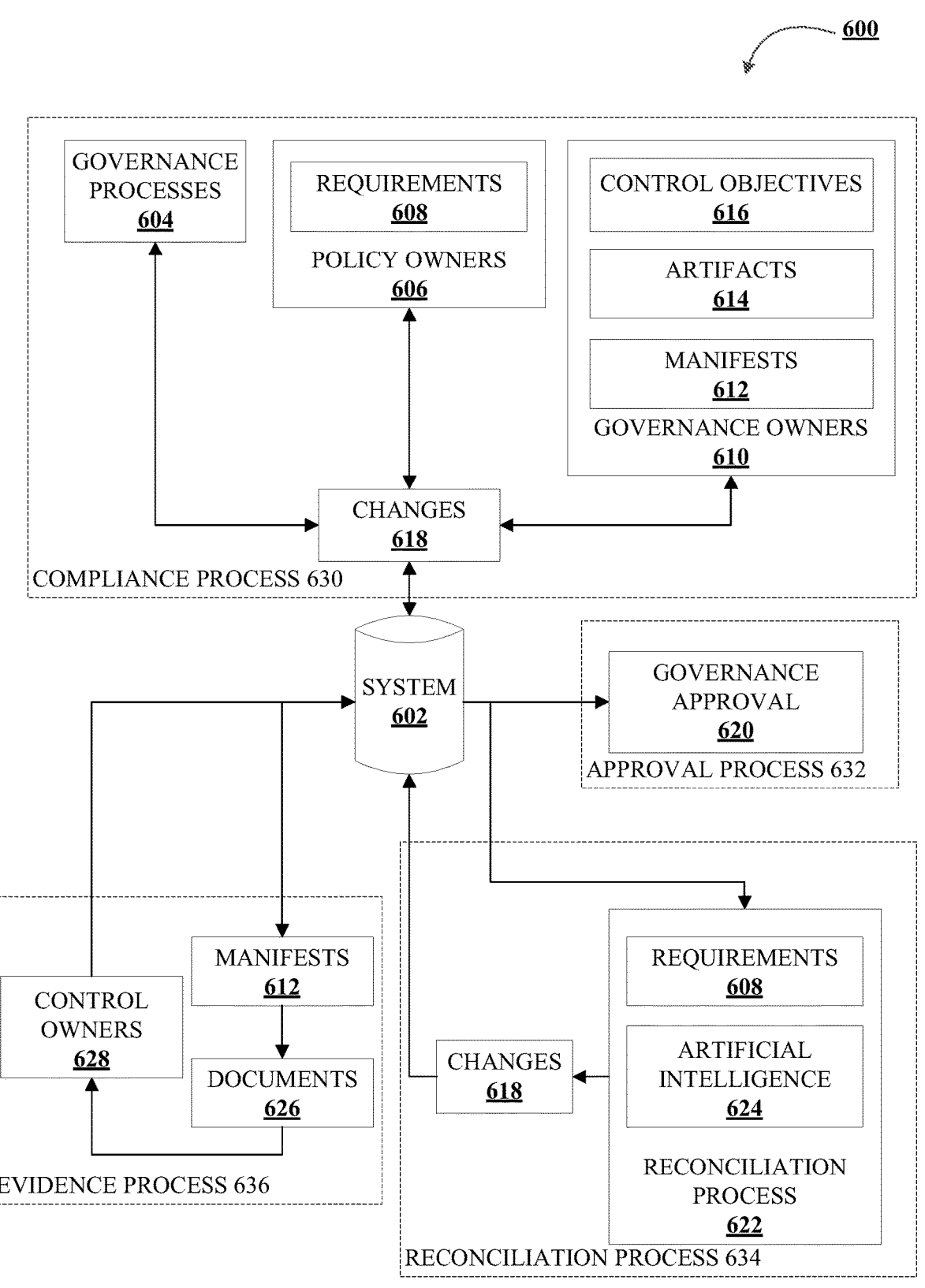

FIG. 6 illustrates a non-limiting example process flow of the process compliance determination system.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Governance processes ensure adherence to an entity's existing policies, standards, requirements, and/or the like through evidence of adherence to the policies, standards, requirements, and/or the like. In some cases, no evidence of such adherence can be found, which may require an uncertainty analysis. Presently, adherence to such governance processes may be subject to interpretation which may include subjective understanding for those implementing such processes, as well as for those tasked with evaluating adherence. Current systems designed to ensure adherence to policies require vast amounts of resources (e.g., human resources, computing resources, networking resources, memory resources, storage resources, and/or the like) to operate. In some cases, implementing and evaluating governance processes, and subsequent adherence to such processes, may take extreme amounts of time to set up and carry out. Therefore, the task of presenting evidence that shows adherence should be unambiguous and simple.

Accordingly, the present disclosure may receive governance processes (e.g., laws, rules, regulations, and/or the like). In some embodiments, once the governance processes are received, policy owners may create policies, standards, and requirements, which are then passed on to governance owners. Governance owners may create control objectives (e.g., adherence goals for the policies, standards, and requirements), artifacts (e.g., documentation evidencing such adherence), and/or manifests (e.g., instructions for how to find and/or access artifacts). Intermediate control layers incorporating artificial intelligence may be created, which may be use the control objectives, artifacts, and manifests to ensure adherence to the governance processes.

What is more, the present disclosure provides a technical solution to a technical problem. As described herein, the technical problem includes ambiguous interpretation of governance processes as well as overconsumption of resources attempting to adhere to those governance processes. The technical solution presented herein allows for adherence to governance processes in an accurate, effective, and efficient manner. In particular, the process compliance determination system is an improvement over existing solutions to the issue of ambiguous and resource intensive compliance systems, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment 100 for determining process compliance using advanced computational models for data analysis and automated decision-making, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request
and receive service from a centralized server (e.g., system
130). In some other embodiments, the system 130 and the
end-point device(s) 140 may have a peer-to-peer relation-
ship in which the system 130 and the end-point device(s)
140 are considered equal and all have the same abilities to
use the resources available on the network 110. Instead of
having a central server (e.g., system 130) which would act
as the shared drive, each device that is connect to the
network 110 would act as the server for the files stored on
it.

The system 130 may represent various forms of servers,
such as web servers, database servers, file server, or the like,
various forms of digital computing devices, such as laptops,
desktops, video recorders, audio/video players, radios,
workstations, or the like, or any other auxiliary network
devices, such as wearable devices, Internet-of-things
devices, electronic kiosk devices, mainframes, or the like, or
any combination of the aforementioned.

The end-point device(s) 140 may represent various forms
of electronic devices, including user input devices such as
personal digital assistants, cellular telephones, smartphones,
laptops, desktops, and/or the like, merchant input devices
such as point-of-sale (POS) devices, electronic payment
kiosks, resource distribution devices, and/or the like, elec-
tronic telecommunications device (e.g., automated teller
machine (ATM)), and/or edge devices such as routers,
routing switches, integrated access devices (IAD), and/or the
like.

The network 110 may be a distributed network that is
spread over different networks. This provides a single data
communication network, which can be managed jointly or
separately by each network. Besides shared communication
within the network, the distributed network often also sup-
ports distributed processing. In some embodiments, the
network 110 may include a telecommunication network,
local area network (LAN), a wide area network (WAN),
and/or a global area network (GAN), such as the Internet.
Additionally, or alternatively, the network 110 may be
secure and/or unsecure and may also include wireless and/or
wired and/or optical interconnection technology. The net-
work 110 may include one or more wired and/or wireless
networks. For example, the network 110 may include a
cellular network (e.g., a long-term evolution (LTE) network,
a code division multiple access (CDMA) network, a 3G
network, a 4G network, a 5G network, another type of next
generation network, and/or the like), a public land mobile
network (PLMN), a local area network (LAN), a wide area
network (WAN), a metropolitan area network (MAN), a
telephone network (e.g., the Public Switched Telephone
Network (PSTN)), a private network, an ad hoc network, an
intranet, the Internet, a fiber optic-based network, a cloud
computing network, or the like, and/or a combination of
these or other types of networks.

It is to be understood that the structure of the distributed
computing environment and its components, connections
and relationships, and their functions, are meant to be
exemplary only, and are not meant to limit implementations
of the disclosures described and/or claimed in this docu-
ment. In one example, the distributed computing environ-
ment 100 may include more, fewer, or different components.
In another example, some or all of the portions of the
distributed computing environment 100 may be combined
into a single portion, or all of the portions of the system 130
may be separated into two or more distinct portions.

FIG. 1B illustrates an exemplary component-level struc-
ture of the system 130, in accordance with an embodiment of the disclosure. As shown in FIG. 1B, the system 130 may
include a processor 102, memory 104, storage device 106, a
high-speed interface 108 connecting to memory 104, high-
speed expansion points 111, and a low-speed interface 112
connecting to a low-speed bus 114, and an input/output (I/O)
device 116. The system 130 may also include a high-speed
interface 108 connecting to the memory 104, and a low-
speed interface 112 connecting to low-speed port 114 and
storage device 106. Each of the components 102, 104, 106,
108, 111, and 112 may be operatively coupled to one another
using various buses and may be mounted on a common
motherboard or in other manners as appropriate. As
described herein, the processor 102 may include a number of
subsystems to execute the portions of processes described
herein. Each subsystem may be a self-contained component
of a larger system (e.g., system 130) and capable of being
configured to execute specialized processes as part of the
larger system. The processor 102 may process instructions
for execution within the system 130, including instructions
stored in the memory 104 and/or on the storage device 106
to display graphical information for a GUI on an external
input/output device, such as a display 116 coupled to a
high-speed interface 108. In some embodiments, multiple
processors, multiple buses, multiple memories, multiple
types of memory, and/or the like may be used. Also, multiple
systems, same or similar to system 130, may be connected,
with each system providing portions of the necessary opera-
tions (e.g., as a server bank, a group of blade servers, a
multi-processor system, and/or the like). In some embodi-
ments, the system 130 may be managed by an entity, such as
a business, a merchant, a financial institution, a card man-
agement institution, a software and/or hardware develop-
ment company, a software and/or hardware testing company,
and/or the like. The system 130 may be located at a facility
associated with the entity and/or remotely from the facility
associated with the entity.

The processor 102 can process instructions, such as
instructions of an application that may perform the functions
disclosed herein. These instructions may be stored in the
memory 104 (e.g., non-transitory storage device) or on the
storage device 106, for execution within the system 130
using any subsystems described herein. It is to be understood
that the system 130 may use, as appropriate, multiple
processors, along with multiple memories, and/or I/O
devices, to execute the processes described herein.

The memory 104 may store information within the system
130. In one implementation, the memory 104 is a volatile
memory unit or units, such as volatile random access
memory (RAM) having a cache area for the temporary
storage of information, such as a command, a current
operating state of the distributed computing environment
100, an intended operating state of the distributed computing
environment 100, instructions related to various methods
and/or functionalities described herein, and/or the like. In
another implementation, the memory 104 is a non-volatile
memory unit or units. The memory 104 may also be another
form of computer-readable medium, such as a magnetic or
optical disk, which may be embedded and/or may be remov-
able. The non-volatile memory may additionally or alterna-
tively include an EEPROM, flash memory, and/or the like
for storage of information such as instructions and/or data
that may be read during execution of computer instructions.
The memory 104 may store, recall, receive, transmit, and/or
access various files and/or information used by the system
130 during operation. The memory 104 may store any one
or more of pieces of information and data used by the system
in which it resides to implement the functions of that system.

In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router (e.g., through a network adapter).

The system 130 may be implemented in a number of different forms. For example, the system 130 may be implemented as a standard server, or multiple times in a group of such servers. Additionally, the system 130 may also be implemented as part of a rack server system or a personal computer (e.g., laptop computer, desktop computer, tablet computer, mobile telephone, and/or the like). Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 156, 158, 160, 162, 164, 166, 168 and 170, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor 152 may be implemented as a chipset of chips that include separate and multiple analog and digital processors. The processor 152 may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156 (e.g., input/output device 156). The display 156 may be, for example, a Thin-Film-Transistor Liquid Crystal Display (TFT LCD) or an Organic Light Emitting Diode (OLED) display, or other appropriate display technology. An interface of the display may include appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a Single In Line Memory Module (SIMM) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, near-field communication (NFC), and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed application specific integrated circuits (ASICs), computer hardware, firmware, software, and/or combinations thereof.

FIG. 2 illustrates a process flow for determining process compliance using advanced computational models for data analysis and automated decision-making, in accordance with an embodiment of the disclosure. The method may be carried out by various components of the distributed computing environment 100 discussed herein (e.g., the system 130, one or more end-point device(s) 140, etc.). An example system may include at least one processing device and at least one non-transitory storage device with computer-readable program code store thereon and accessible by the at least one processing device, wherein the computer-readable code when executed is configured to carry out the method discussed herein.

In some embodiments, a process compliance determination system (e.g., similar to one or more of the systems described herein with respect to FIGS. 1A-1C) may perform one or more of the steps of process flow 200. For example, a process compliance determination system (e.g., the system 130 described herein with respect to FIGS. 1A-1C) may perform the steps of process flow 200.

As shown in block 202, the process flow 200 of this embodiment includes generating one or more intermediate control layers, wherein the one or more intermediate control layers comprises one or more artificial intelligence models. In some embodiments, the one or more intermediate control layers may include defining control objectives, determining artifacts, developing manifests, and/or the like. In some embodiments, the intermediate control layers may include artificial intelligence models. In some embodiments, the intermediate control layers may include Natural Language Processing (NLP). In some embodiments, the artificial intelligence model may automate the evidence (e.g., artifact) production portion required by the governance processes. In some embodiments, the intermediate control layers may be created by governance owners, wherein the governance owners create the intermediate control layers based on the governance processes, policies, standards, requirements, and/or the like.

As shown in block 204, the process flow 200 of this embodiment includes generating one or more control objectives, wherein each of the one or more control objectives are associated with one or more governance processes, and wherein the control objectives comprise a compliance target. In some embodiments, the control objectives may include requirements based on the governance processes. In this way, the governance process may define the control objectives. In some embodiments, the control objectives may include specific policies, standards, requirements, and/or the like which define a unique contextual view from the governance perspective.

In some embodiments, the compliance target may include the goals, targets, objectives, and/or the like the control objectives set out to accomplish. In some embodiments, the compliance target may include an explanation of the control objective in terms that express how the manifests and artifacts ensure compliance. For instance, and by way of non-limiting example, a compliance target may include a particular compliance goal of a control objective. In this way, the compliance target may describe or explain the control objective so the associated manifests and artifacts correctly relate to the control objective.

As shown in block 206, the process flow 200 of this embodiment includes generating, in response to the one or more control objectives, one or more manifests, wherein the manifests contain instructions for receiving one or more artifacts. In some embodiments, the manifests may include instructions or directions on where to derive (e.g., receive) evidence (e.g., artifacts). In some embodiments, the manifests may direct the process compliance determination system on how to identify and obtain artifacts required by the governance processes. In some embodiments, the manifest may detail steps, rules, parameters, and/or the like which are necessary for retrieval of artifacts required in the governance process. In some embodiments, the manifest may be a structured tool that may direct the process compliance determination system, or a user of the process compliance determination system, on which documents (e.g., artifacts) to retrieve, where to find them, how to validate their authenticity, and/or the like.

In some embodiments, the manifest may include metadata associated with the artifacts such as artifact location, format, expected content, validation rules, and/or the like. In some embodiments, the manifests may ensure standardization, creating an efficient approach to artifact retrieval and processing. In some embodiments, the manifests may be dynamically updated to reflect any changes throughout the process (e.g., governance process changes, intermediate control layer changes, control objective changes, manifest changes, and/or the like).

As shown in block 208, the process flow 200 of this embodiment includes receiving, in response to the one or more manifests, the one or more artifacts, wherein the one or more artifacts comprise data associated with the one or more governance processes. In some embodiments, the artifacts may include specific unambiguous evidence required by a governance process. In some embodiments, the artifacts may include a variety of items, such as source code, documentation, messages, text documents, video documents, picture documents, process flows, form submission documents, and/or the like.

In some embodiments, the artifacts may be automatically derived by the process compliance determination system. In some embodiments, the artifacts may be derived by the artificial intelligence model. In some embodiments, deriving (e.g., receiving) the artifacts may include retrieving specific artifacts that relate, correspond, are associated with the governance process. For instance, and by way of non-limiting example, a governance process may require a specific artifact relating to an architectural drawing. The process compliance determination system may then derive the specific artifact as required by the governance process.

In some embodiments, the artifacts may be manually derived by a manual operation process. In this way, manual entry of the artifact(s) may include taking screenshots, providing text entries, copying and pasting documents, copying and pasting code portions, and/or the like. For instance, and by way of non-limiting example, if a governance process requires an artifact that relates to a portion of source code, a manual entry (e.g., screenshot, copy and paste, text entry) of the portion of source code may suffice for approval of the artifact.

As shown in block 210, the process flow 200 of this embodiment includes capturing data from the one or more artifacts, wherein the data comprises evidence of meeting the compliance target. In some embodiments, capturing the data from the artifacts may include using the artificial intelligence model to understand the contents of the artifacts. In this way, the artificial intelligence model may use NLP to capture and understand the data from the artifacts. For instance, and by way of non-limiting example, the artificial intelligence model (e.g., using NLP) may include using tokenization (e.g., breaking down text into individual words or tokens), part-of-speech tagging (e.g., identifying grammatical groups of each word), named entity recognition (e.g., identifying specific entities in text such as people, organizations, locations, expressions of times, quantities, percentages, etc.), dependency parsing (e.g., determining relationships between words and how they are used), topic modeling (e.g., discovering main topics within documents), text classification (e.g., classifying text into categories), sentiment analysis (e.g., determining attitude or emotion of text), embedding models (e.g., creating vector representation of words to capture context and semantic meaning of the words), optical character recognition (e.g., method to extract text from image or video data), and/or the like.

In some embodiments, the artifacts may include evidence of meeting the compliance target. In some embodiments, the compliance target may require particular evidence found in certain artifacts to meet the rules set forth by the process compliance determination system. In this way, the governance processes, intermediate control layers, control objectives, and/or the like may, through the compliance target, require particular evidence from the artifacts.

As shown in block 212, the process flow 200 of this embodiment includes comparing the captured data from the one or more artifacts with the one or more intermediate control layers. In some embodiments, comparing the data from the artifacts with the intermediate control layers may include using rule-based systems, machine learning, deep learning, semantic analysis, anomaly detection, and/or the like. In this way, the process compliance determination may extract the data from the artifacts. Next, the process compliance determination system may apply the governance process (e.g., determine what the governance process requires from the artifact). Further, the process compliance determination system may determine the data from the artifact matches the governance process. In some embodiments, the process compliance determination system may use data captured from one artifact in multiple governance processes. In some embodiments, a single governance process may apply to data captured from multiple artifacts.

As shown in block 214, the process flow 200 of this embodiment includes approving the one or more artifacts. In some embodiments, approving the one or more artifacts may include comparing the extracted data with the governance processes, data validation (e.g., determining whether the data meets the conditions in the rules through data type checking, range checking, format checking, etc.), approval or rejection of the extracted data, handling exceptions (e.g., flagging extracted data for human review).

In some embodiments, the process compliance determination system may perform an uncertainty analysis, which may include determining variability, ambiguity, uncertainty, and/or the like from poor quality data, missing data, extraction errors, and/or the like from the artifacts. In some embodiments, the uncertainty analysis may include identifying the uncertainty, quantifying the uncertainty (e.g., determining probable outcomes based on the uncertainty, uncertainty propagation (e.g., impact from the uncertainty on the process compliance determination system), uncertainty interpretation (e.g., decisioning based on the uncertainty), uncertainty communication (e.g., communication to a decision-making entity), uncertainty reduction (e.g., mitigation of the uncertainty through additional data gathering, improving data quality, refining the artificial intelligence model, and/or the like), and/or the like.

In some embodiments, the process compliance determination system may determine an amount of resources consumed associated with approving the one or more artifacts. In some embodiments, determining the amount of resources consumed associated with approving the one or more artifacts may include determining resources consumed without the process compliance determination system. In this way, the resources consumed may reflect a system that does not have the process compliance determination system (e.g., a system where the entire approval process may be performed by manual operation).

In some embodiments, the process compliance determination may determine the amount of resources consumed by the process compliance determination system. In this way, the amount of resources may reflect the amount of resources (e.g., networking resources, memory resources, computing resources, human resources, and/or the like) consumed during the entire process.

In some embodiments, the process compliance determination system may reduce the amount of resources consumed by a resource conservation amount. In some embodiments, the resource conservation amount may be determined by improving efficiencies throughout the process compliance determination system. In this way, the process compliance determination may make changes based on resource management. For instance, and by way of non-limiting example, the artificial intelligence model may be refined (e.g., reconfigured) in a way to allow for more efficient data extraction from the artifacts. Additionally, or alternatively, the artificial intelligence model may be continuously refined (e.g., reconfigured) for certain governance processes requiring differing amounts of artifacts. In this way, the artificial intelligence model may learn to increase efficiency of the process compliance determination system based on the type of governance process.

In some embodiments, the process compliance determination system may aggregate the captured data from the one or more artifacts. In some embodiments, aggregating the captured data from the artifacts may include compiling the data from the artifacts into a document, or the like. In this way, the captured data from the artifacts may represent all of the data associated with all of the artifacts for a particular governance process requirement. For instance, and by way of non-limiting example, if a governance process requires data (e.g., evidence) from two particular artifacts, the process compliance determination system may aggregate the data from those two artifacts into a single document.

In some embodiments, the process compliance determination system may compare, in response to the one or more control objectives, the aggregated captured data from the one or more artifacts with the one or more governance processes. In some embodiments, the data captured from the artifacts and the governance processes may be compared after the data from the artifacts has been captured.

In some embodiments, the process compliance determination system may verify the aggregated captured data from the one or more artifacts matches the one or more governance processes. In some embodiments, the verification may ensure compliance with the governance processes. In this way, the process compliance determination system may check through the artifacts for a particular governance process to ensure compliance with the governance process.

FIG. 3 illustrates a process flow for approving one or more artifacts, in accordance with an embodiment of the disclosure. The method may be carried out by various components of the distributed computing environment 100 discussed herein (e.g., the system 130, one or more endpoint device(s) 140, etc.). An example system may include at least one processing device and at least one non-transitory storage device with computer-readable program code store thereon and accessible by the at least one processing device, wherein the computer-readable code when executed is configured to carry out the method discussed herein.

In some embodiments, a process compliance determination system (e.g., similar to one or more of the systems described herein with respect to FIGS. 1A-1C) may perform one or more of the steps of process flow 300. For example, a process compliance determination system (e.g., the system 130 described herein with respect to FIGS. 1A-1C) may perform the steps of process flow 300.

As shown in block 302, the process flow 300 of this embodiment includes determining, in response to comparing the captured data from the one or more artifacts with the one or more control objectives, a received evidence threshold, wherein the received evidence threshold comprises characteristics associated with the artifacts. In some embodiments, the received evidence threshold may include the threshold of the artifacts received by the process compliance determination system. In this way, the received evidence threshold may include analyzing quantitative and qualitative characteristics of the received artifacts. For instance, and by way of non-limiting example, the received evidence threshold may include the amount of artifacts received, document (e.g. artifact) length, keyword frequency, metadata associated with the artifact, structure count, citation count, and/or the like. In another instance, and by way of non-limiting example, the qualitative aspects may include content relevance, source reliability, contextual understanding, textual quality, conceptual completeness, and/or the like. In this way, the received evidence threshold may include variations on the qualitative and quantitative aspects of the characteristics of the artifacts.

As shown in block 304, the process flow 300 of this embodiment includes comparing the received evidence threshold with an acceptable evidence threshold, wherein the acceptable evidence threshold comprises characteristics associated with the intermediate control layers. In some embodiments, the acceptable evidence threshold may include both qualitative and quantitative characteristics (e.g., similar to the qualitative and quantitative aspects listed above). In some embodiments, each characteristic of the acceptable evidence threshold may be compared against the respective received evidence threshold characteristic. For instance, and by way of non-limiting example, the acceptable evidence threshold, which may include keyword frequency and source reliability, may be compared with the keyword frequency and source reliability of the artifacts received.

As shown in block 306, the process flow 300 of this embodiment includes approving, in response to the received evidence threshold meeting the acceptable evidence threshold, the one or more artifacts. In some embodiments, the acceptable evidence threshold and the received evidence threshold may be compared to approve the artifacts. In this way, each of the characteristics (e.g., qualitative and quantitative characteristics) may be analyzed independently, compared with other characteristics, or both. In some embodiments, each of the characteristics may be given a weighted value, wherein the weighted value may determine the importance of the given characteristic. For instance, and by way of non-limiting example, if a particular governance process requires high source reliability, a specific artifact may be required to have a high source reliability characteristic for approval.

FIG. 4 illustrates a process flow for receiving an approval of the one or more artifacts, in accordance with an embodiment of the disclosure. The method may be carried out by various components of the distributed computing environment 100 discussed herein (e.g., the system 130, one or more end-point device(s) 140, etc.). An example system may include at least one processing device and at least one non-transitory storage device with computer-readable program code store thereon and accessible by the at least one processing device, wherein the computer-readable code when executed is configured to carry out the method discussed herein.

In some embodiments, a process compliance determination system (e.g., similar to one or more of the systems described herein with respect to FIGS. 1A-1C) may perform one or more of the steps of process flow 400. For example, a process compliance determination system (e.g., the system 130 described herein with respect to FIGS. 1A-1C) may perform the steps of process flow 400.

As shown in block 402, the process flow 400 of this embodiment includes determining, in response to the one or more manifests, the one or more artifacts applicable to the one or more control objectives. In some embodiments, determining which artifacts are applicable to the control objectives may include analyzing the control objective to determine the rules, regulations, laws, and/or the like that are required to be met. In this way, the artifacts with the requisite information may be applicable to the control objectives.

As shown in block 404, the process flow 400 of this embodiment includes transmitting the one or more artifacts to one or more control owners, wherein the one or more control owners are users of the system. In some embodiments, the control owners may include users of the process compliance determination system, wherein the users may be managers, technicians, third parties, contractors, and/or the like. In some embodiments, the control owners may be associated with the entity where the process compliance determination system is housed (e.g., installed).

As shown in block 406, the process flow 400 of this embodiment includes receiving, in response to the one or more control owners, an approval of the one or more artifacts. In some embodiments, the control owners may manually approve the artifacts. In some embodiments, the control owners may use the artificial intelligence model to approve the artifacts.

FIG. 5 illustrates a process flow for approving, in response to receiving one or more changes, the one or more artifacts, in accordance with an embodiment of the disclosure. The method may be carried out by various components of the distributed computing environment 100 discussed herein (e.g., the system 130, one or more end-point device(s) 140, etc.). An example system may include at least one processing device and at least one non-transitory storage device with computer-readable program code store thereon and accessible by the at least one processing device, wherein the computer-readable code when executed is configured to carry out the method discussed herein.

In some embodiments, a process compliance determination system (e.g., similar to one or more of the systems described herein with respect to FIGS. 1A-1C) may perform one or more of the steps of process flow 500. For example, a process compliance determination system (e.g., the system 130 described herein with respect to FIGS. 1A-1C) may perform the steps of process flow 500.

As shown in block 502, the process flow 500 of this embodiment includes receiving one or more changes. In some embodiments, the one or more changes may include one or more changes to the one or more governance processes, one or more control objectives, one or more manifests, or one or more artifacts. In some embodiments, the changes may include a re-approval process of the artifacts and/or governance process (e.g., governance approval).

In some embodiments, the changes may trigger an evaluation (e.g., re-evaluation) of the changed process (e.g., governance process, control objective, manifest, artifact, and/or the like). In this way, the process compliance determination system may detect a change which may trigger a re-evaluation of the changed process. For instance, and by way of non-limiting example, the process compliance determination system may receive a change relating to a governance process. The process compliance determination system may then evaluate the changed governance process, and evaluate any changes to the intermediate control layer, control objectives, manifests, artifacts, and/or the like. In this way, the process compliance determination system is performing the compliance determination process on the newly received changed governance process.

As shown in block 504, the process flow 500 of this embodiment includes generating one or more additional control objectives, wherein each of the one or more control objectives is associated with the one or more changes. In some embodiments, the additional control objectives may be created using a similar process as the control objectives (e.g., original control objectives) are created. In this way, the additional control objectives may reflect changes to the governance processes, control objectives, manifests, and/or artifacts.

As shown in block 506, the process flow 500 of this embodiment includes capturing data from one or more additional artifacts. In some embodiments, capturing the data may be similar to how data is captured from the artifacts (e.g., original artifacts). In this way, the data captured from the additional artifacts may reflect the changes made to the governance processes, control objectives, manifests, and/or artifacts.

As shown in block 508, the process flow 500 of this embodiment includes determining, in response to comparing the captured data from the one or more additional artifacts with the one or more additional control objectives, an additional received evidence threshold. In some embodiments, the additional received evidence threshold may include an uncertainty analysis to determine whether the additional artifacts are acceptable. In this way, the process compliance determination system may determine whether the additional artifacts are acceptable in response to the data captured from them. In some embodiments, the additional received evidence threshold may include a threshold set by a user, entity, technician, and/or the like of the process compliance determination system, which may include requirements the additional artifacts should meet to comply with the governance processes.

As shown in block 510, the process flow 500 of this embodiment includes approving, in response to the additional received evidence threshold meeting an additional acceptable evidence threshold, the one or more additional artifacts. In some embodiments, approving the additional artifacts may be similar to approving the artifacts, as mentioned above. In some embodiments, approving the additional artifacts may include determining the additional acceptable evidence threshold in response to an uncertainty analysis. In this way, the uncertainty analysis may include determining the uncertainty associated with the additional artifacts. For instance, and by way of non-limiting example, if the uncertainty analysis reveals that the additional artifacts do not meet the criteria in the uncertainty analysis, the process compliance determination system may require more additional artifacts. In another instance, and by way of non-limiting example, if the uncertainty analysis reveals the uncertainty analysis is acceptable in response to the additional artifacts (e.g., the additional artifacts meet the received evidence threshold compared with the acceptable evidence threshold), the additional artifacts may be approved.

FIG. 6 illustrates a non-limiting example process flow of the process compliance determination system, in accordance with an embodiment of the disclosure. The method may be carried out by various components of the distributed computing environment 100 discussed herein (e.g., the system 130, one or more end-point device(s) 140, etc.). An example system may include at least one processing device and at least one non-transitory storage device with computer-readable program code store thereon and accessible by the at least one processing device, wherein the computer-readable code when executed is configured to carry out the method discussed herein.

In some embodiments, a process compliance determination system (e.g., similar to one or more of the systems described herein with respect to FIGS. 1A-1C) may perform one or more of the steps of process flow 600. For example, a process compliance determination system (e.g., the system 130 described herein with respect to FIGS. 1A-1C) may perform the steps of process flow 600.

As shown in block 602, the process flow 600 of this embodiment includes a system. In some embodiments, the system 602 may be the process compliance determination system (e.g., similar to system 130).

As shown in block 604, the process flow 600 of this embodiment includes governance processes. In some embodiments, the governance processes 604 may include laws, rules, regulations, and/or the like. In some embodiments, the governance processes may originate from a variety of sources, such as the National Institute of Standards and Technology (NIST), the International Organization for Standarization (ISO), an international government entity, a federal government entity, a state government entity, a local government entity, and/or the like. In some embodiments, the system may ensure compliance with the governance processes.

As shown in block 606, the process flow 600 of this embodiment includes policy owners. In some embodiments, the policy owners may be associated with the laws, rules, regulations, and/or the like (e.g., similar to the governance processes 604). In this way, the policy owners may interact with the governance processes, and may change, update, add to, delete from, amend, and/or the like the governance processes.

As shown in block 608, the process flow 600 of this embodiment includes requirements. In some embodiments, the requirements 608 may include policies, standards, requirements, and/or the like that may originate from the policy owners 606. In this way, the policy owners may create the requirements 608 in response to the governance processes 604. In some embodiments, the requirements 608 may reflect the substance of the governance processes 604. In some embodiments, the requirements 608 may be created to allow for the system 602 to receive, process, and understand the governance processes 604. In this way, the requirements may align (e.g., be similar to, be equal to, replicate, etc.) to the governance processes, but may also be created in a way that allows the system to function.

As shown in block 610, the process flow 600 of this embodiment includes governance owners. In some embodiments, the governance owners may create the intermediate control layer, which may comprise control objectives, artifacts, and manifests. In some embodiments, complying with the intermediate control layers created by the governance owners may ensure compliance with the governance processes.

As shown in block 612, the process flow 600 of this embodiment includes manifests. In some embodiments, the manifests may include instructions on where to derive the artifacts required by the intermediate control layer, governance processes, governance owners, and/or the like. In this way, the manifests may operate as a list that provides information on how to capture the respective artifact(s) for a particular requirement. For instance, and by way of non-limiting example, if a governance process, intermediate control layer, and/or control objective requires two specific artifacts, the manifest will include instructions on how to obtain those specific artifacts to ensure compliance with the governance process, intermediate control layer, and/or control objective.

As shown in block 614, the process flow 600 of this embodiment includes artifacts. In some embodiments, the artifacts may include specific, unambiguous items (e.g., documents, papers, messages, code, and/or the like) that ensure compliance with the governance processes. In some embodiments, the artifacts may ensure compliance with the control objectives, the intermediate control layer, and/or the like.

In some embodiments, the artifacts may include certain documents that cannot be retrieved by an automated process (e.g., require a manual approach to obtaining). In this way, the artifacts may include manual derivatives of the artifacts (e.g., screenshots, user-inputted messaging, copies of code text, and/or the like). In some embodiments, the artifacts may include descriptions of the artifacts that describe what the artifact is, what the artifact pertains to, and how the artifact applies to the process compliance determination system.

As shown in block 616, the process flow 600 of this embodiment includes control objectives. In some embodiments, the control objectives may be similar to the control objectives mentioned above.

As shown in block 618, the process flow 600 of this embodiment includes changes. In some embodiments, the changes may include changes to any of the inputs to the system (e.g., changes to the governance processes 604, requirements 608, control objectives 616, artifacts 614, manifests 612, and/or the like). In this way, the changes may change how the process compliance determination system ensures compliance with a governance process. For instance, and by way of non-limiting example, if an artifact experiences a change (e.g., changes 618), the process compliance determination system may receive those changes and reconfigure the process to comply with a governance process (e.g., governance processes 604).

As shown in block 620, the process flow 600 of this embodiment includes governance approval. In some embodiments, the governance approval may include acceptably evidenced governance processes, uncertainty accepted governance processes, and/or the like. In this way, the governance processes 604 may each be reviewed by the process compliance determination system and determined to be acceptable due to the evidence being acceptable, or the uncertainty level associated with the governance process being acceptable. For instance, and by way of non-limiting example, if a particular governance process requires a specific artifact, and that artifact is provided, the governance processes may be determined to be acceptably evidenced. In another instance, and by way of non-limiting example, if a particular governance process requires a specific artifact, but that artifact is not provided, the governance process may still be uncertainty accepted if it is determined the uncertainty level for the missing artifact is acceptable.

As shown in block 622, the process flow 600 of this embodiment includes reconciliation process. In some embodiments, the reconciliation process may be used to determine the compliance with a governance process. In some embodiments, the reconciliation process may use an artificial intelligence model to recreate (e.g., reconstruct, or the like) the manifest, control objectives, intermediate control layers, governance processes, and/or the like based on the received artifacts. In this way, the reconciliation process may gather the artifacts the process compliance determination system has received for a particular governance process and feed them through the reconciliation process to ensure the required artifacts are acceptable for the governance process requirements.

As shown in block 624, the process flow 600 of this embodiment includes artificial intelligence. In some embodiments, the artificial intelligence model may include a Natural Language Processing (NLP) model.

As shown in block 626, the process flow 600 of this embodiment includes documents. In some embodiments, the documents 626 may include artifacts required for a governance process. In some embodiments, the manifest may determine which artifacts are applicable in response to a governance process. In some embodiments, the documents 626 may include various types of documents, such as snapshots, screenshots, artificial intelligence, governance approval, and/or the like. In some embodiments, the documents 626 may be generated automatically by artificial intelligence (e.g., similar to artificial intelligence 624). In some embodiments, the documents 626 may not be automated, and may require manual intervention for production.

As shown in block 628, the process flow 600 of this embodiment includes control owners. In some embodiments, the control owners may approve the evidence (e.g., artifacts) that pertain to a governance process. In this way, the control owners may approve the evidence submitted for a governance process. Additionally, or alternatively, the control owners may deny the evidence submitted, and may require additional action be taken. In some embodiments, the additional action may include re-submitting additional artifacts. In some embodiments, the additional action may include performing an uncertainty analysis to determine whether the uncertainty level, created by not submitting the proper artifacts, is at an acceptable level.

As shown in block 630, the process flow 600 of this embodiment includes a compliance process. For instance, and by way of non-limiting example, a governance process 604 may relate to architectural diagrams. In this way, the policy owners 606 may create an intermediate control layer, which may include the requirements 608, that relate to the architectural diagrams by using Natural Language Processing (NLP), artificial intelligence, and/or the like. In this way, the requirements 608 may include key words, flow diagrams, specifications, and/or the like that relate to the architectural drawings.

The governance owners 610 may then define the required control objectives 616 that are applicable, define the required artifacts 614 that are required, and breakdown the system components in the manifests 612. Additionally, or alternatively, the process compliance determination system may submit the artifacts to an artifact repository. In this way, the process compliance determination system may then begin pulling information relating to the artifacts required by the architectural diagrams. Further, the artifacts may be formatted in a way to promote ease-of-use for the control owners 628 to review.

As shown in block 632, the process flow 600 of this embodiment includes an approval process. In some embodiments, the approval process may be similar to the governance approval 620. In this way, the approval process may include approving the artifacts for a particular governance process.

As shown in block 634, the process flow 600 of this embodiment includes a reconciliation process. In some embodiments, the reconciliation process may include receiving requirements 608, inputting the requirements into an artificial intelligence model 624, adjusting the requirements and/or the artificial intelligence model in response to any changes 618, and ensuring the artifacts are acceptable for the governance process in question.

As shown in block 636, the process flow 600 of this embodiment includes an evidence process. In some embodiments, the evidence process may include receiving manifests 612 and documents 626, and transmitting them to control owners 628 for approval. In this way, the control owners may review the manifests 612 and associated documents 626 (e.g., artifacts, or the like) and approve them in response to a particular governance process (e.g., similar to governance process 604).

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for determining process compliance using advanced computational models for data analysis and automated decision making, the system comprising:
    a processing device;
    a non-transitory storage device containing instructions when executed by the processing device, causes the processing device to perform the steps of:
        generate one or more intermediate control layers, wherein the one or more intermediate control layers comprises one or more artificial intelligence models;
        generate one or more control objectives, wherein each of the one or more control objectives are associated with one or more governance processes, and wherein the control objectives comprise a compliance target;
        generate, in response to the one or more control objectives, one or more manifests, wherein the manifests contain instructions for receiving one or more artifacts;
        receive, in response to the one or more manifests, the one or more artifacts, wherein the one or more artifacts comprise data associated with the one or more governance processes;
        capture data from the one or more artifacts, wherein the data comprises evidence of meeting the compliance target;
        compare the captured data from the one or more artifacts with the one or more intermediate control layers; and
        approve the one or more artifacts.

2. The system of claim 1, wherein approving the one or more artifacts further comprises:
    determine, in response to comparing the captured data from the one or more artifacts with the one or more control objectives, a received evidence threshold, wherein the received evidence threshold comprises characteristics associated with the artifacts;
    compare the received evidence threshold with an acceptable evidence threshold, wherein the acceptable evidence threshold comprises characteristics associated with the intermediate control layers; and
    approve, in response to the received evidence threshold meeting the acceptable evidence threshold, the one or more artifacts.

3. The system of claim 2, wherein executing the instructions further causes the processing device to:
    determine an amount of resources consumed associated with approving the one or more artifacts; and
    reduce the amount of resources consumed by a resource conservation amount.

4. The system of claim 1, wherein receiving the one or more artifacts further comprises:
    determining, in response to the one or more manifests, the one or more artifacts applicable to the one or more control objectives;

transmitting the one or more artifacts to one or more control owners, wherein the one or more control owners are users of the system; and
    receiving, in response to the one or more control owners, an approval of the one or more artifacts.

5. The system of claim 1, wherein executing the instructions further causes the processing device to:
    receive one or more changes;
    generate one or more additional control objectives, wherein each of the one or more control objectives is associated with the one or more changes;
    capture data from one or more additional artifacts;
    determine, in response to comparing the captured data from the one or more additional artifacts with the one or more additional control objectives, an additional received evidence threshold; and
    approve, in response to the additional received evidence threshold meeting an additional acceptable evidence threshold, the one or more artifacts.

6. The system of claim 5, wherein the changes may be changes to the:
    one or more governance processes;
    one or more control objectives;
    one or more manifests; or
    one or more artifacts.

7. The system of claim 1, wherein executing the instructions further causes the processing device to:
    aggregate the captured data from the one or more artifacts;
    compare, in response to the one or more control objectives, the aggregated captured data from the one or more artifacts with the one or more governance processes; and
    verify the aggregated captured data from the one or more artifacts matches the one or more governance processes.

8. A computer program product for determining process compliance using advanced computational models for data analysis and automated decision making, the computer program product comprising a non-transitory computer-readable medium comprising code causing an apparatus to:
    generate one or more intermediate control layers, wherein the one or more intermediate control layers comprises one or more artificial intelligence models;
    generate one or more control objectives, wherein each of the one or more control objectives are associated with one or more governance processes, and wherein the control objectives comprise a compliance target;
    generate, in response to the one or more control objectives, one or more manifests, wherein the manifests contain instructions for receiving one or more artifacts;
    receive, in response to the one or more manifests, the one or more artifacts, wherein the one or more artifacts comprise data associated with the one or more governance processes;
    capture data from the one or more artifacts, wherein the data comprises evidence of meeting the compliance target;
    compare the captured data from the one or more artifacts with the one or more intermediate control layers; and
    approve the one or more artifacts.

9. The computer program product of claim 8, wherein approving the one or more artifacts further comprises:
    determine, in response to comparing the captured data from the one or more artifacts with the one or more control objectives, a received evidence threshold, wherein the received evidence threshold comprises characteristics associated with the artifacts;

compare the received evidence threshold with an acceptable evidence threshold, wherein the acceptable evidence threshold comprises characteristics associated with the intermediate control layers; and approve, in response to the received evidence threshold meeting the acceptable evidence threshold, the one or more artifacts.

10. The computer program product of claim 9, wherein the code further causes the apparatus to:

determine an amount of resources consumed associated with approving the one or more artifacts; and reduce the amount of resources consumed by a resource conservation amount.

11. The computer program product of claim 8, wherein receiving the one or more artifacts further comprises:

determining, in response to the one or more manifests, the one or more artifacts applicable to the one or more control objectives;

transmitting the one or more artifacts to one or more control owners, wherein the one or more control owners are users of the system; and receiving, in response to the one or more control owners, an approval of the one or more artifacts.

12. The computer program product of claim 8, wherein the code further causes the apparatus to:

receive one or more changes;

generate one or more additional control objectives, wherein each of the one or more control objectives is associated with the one or more changes;

capture data from one or more additional artifacts;

determine, in response to comparing the captured data from the one or more additional artifacts with the one or more additional control objectives, an additional received evidence threshold; and approve, in response to the additional received evidence threshold meeting an additional acceptable evidence threshold, the one or more artifacts.

13. The computer program product of claim 12, wherein the changes may be changes to the:

one or more governance processes;

one or more control objectives;

one or more manifests; or one or more artifacts.

14. The computer program product of claim 8, wherein the code further causes the apparatus to:

aggregate the captured data from the one or more artifacts;

compare, in response to the one or more control objectives, the aggregated captured data from the one or more artifacts with the one or more governance processes; and verify the aggregated captured data from the one or more artifacts matches the one or more governance processes.

15. A method for determining process compliance using advanced computational models for data analysis and automated decision making, the method comprising:

generating one or more intermediate control layers, wherein the one or more intermediate control layers comprises one or more artificial intelligence models;

generating one or more control objectives, wherein each of the one or more control objectives are associated with one or more governance processes, and wherein the control objectives comprise a compliance target;

generating, in response to the one or more control objectives, one or more manifests, wherein the manifests contain instructions for receiving one or more artifacts;

receiving, in response to the one or more manifests, the one or more artifacts, wherein the one or more artifacts comprise data associated with the one or more governance processes;

capturing data from the one or more artifacts, wherein the data comprises evidence of meeting the compliance target;

comparing the captured data from the one or more artifacts with the one or more intermediate control layers; and approving the one or more artifacts.

16. The method of claim 15, wherein approving the one or more artifacts further comprises:

determining, in response to comparing the captured data from the one or more artifacts with the one or more control objectives, a received evidence threshold, wherein the received evidence threshold comprises characteristics associated with the artifacts;

comparing the received evidence threshold with an acceptable evidence threshold, wherein the acceptable evidence threshold comprises characteristics associated with the intermediate control layers; and approving, in response to the received evidence threshold meeting the acceptable evidence threshold, the one or more artifacts.

17. The method of claim 16, wherein the method further comprises:

determining an amount of resources consumed associated with approving the one or more artifacts; and reducing the amount of resources consumed by a resource conservation amount.

18. The method of claim 15, wherein receiving the one or more artifacts further comprises:

determining, in response to the one or more manifests, the one or more artifacts applicable to the one or more control objectives;

transmitting the one or more artifacts to one or more control owners, wherein the one or more control owners are users of the system; and receiving, in response to the one or more control owners, an approval of the one or more artifacts.

19. The method of claim 15, wherein the method further comprises:

receiving one or more changes;

generating one or more additional control objectives, wherein each of the one or more control objectives is associated with the one or more changes;

capturing data from one or more additional artifacts;

determining, in response to comparing the captured data from the one or more additional artifacts with the one or more additional control objectives, an additional received evidence threshold; and approving, in response to the additional received evidence threshold meeting an additional acceptable evidence threshold, the one or more artifacts.

20. The method of claim 19, wherein the changes may be changes to the:

one or more governance processes;

one or more control objectives;

one or more manifests; or one or more artifacts.

* * * * *